June 8, 1926.

T. J. THORESON

STEEL TRAP COVER

Filed March 1, 1926

1,587,807

Inventor
Theodore J. Thoreson.
By Adam E. Fisher.
Attorney

Patented June 8, 1926.

1,587,807

UNITED STATES PATENT OFFICE.

THEODORE J. THORESON, OF CUSHING, MINNESOTA.

STEEL-TRAP COVER.

Application filed March 1, 1926. Serial No. 91,324.

This invention relates to means for covering steel traps.

In trapping for fox, wolf, mink or any other animals which are timid and shy of anything that does not look natural, it is necessary to cover all traces of where a trap has been set. In order to do this it is a common practice among trappers to cover the trap with paper or burlap and then put ground, light twigs, dried grass, etc. over the same to give it a natural appearance. In many instances when it rains or snows the ground or grass becomes soggy and works underneath the trip pan and causes the same to fail to function.

It is the object of this invention to provide a metal cover to take the place of the usual paper or burlap covering and thereby eliminate the danger of the trap failing to function when covered and also save the trapper the inconvenience of carrying paper, burlap or other covering material with him.

Other objects and advantages will be apparent from the accompanying drawing and specification.

In the drawing

Figure 3 is a detail of the cover plate blank.

Figure 1:
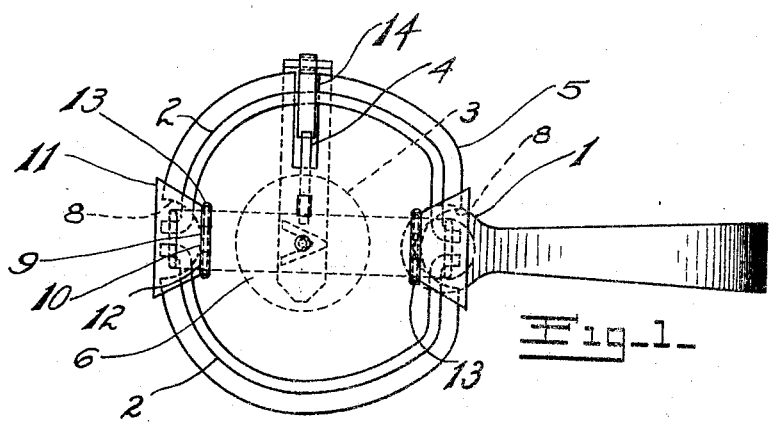
Figure 1 is a plan view of a trap showing the cover mounted thereon and the trap set.
Figure 2:
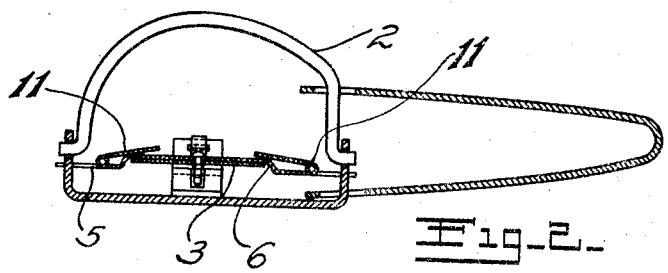
Figure 2 is a longitudinal vertical section of a trap, showing the cover mounted thereon and the trap sprung.
Figure 4:
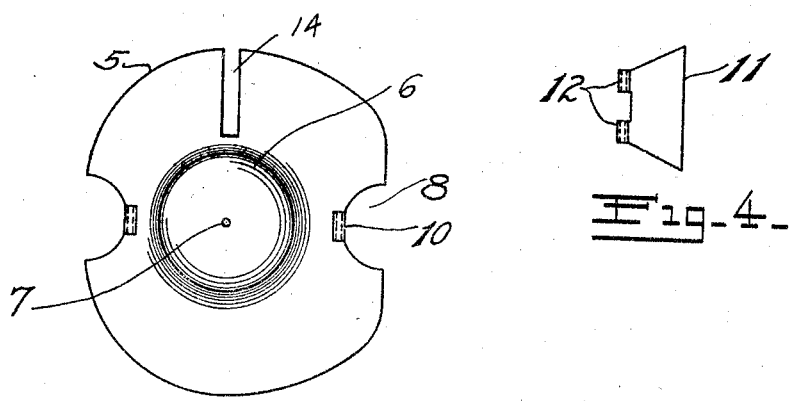
Figure 4 is a detail of a hinged plate.

This invention is carried out upon a steel trap 1 having the usual jaws 2, trip pan 3 and trigger 4.

The invention consists of a sheet metal plate 5 formed with a raised or embossed portion 6 of a diameter slightly larger than the trip pan 3. A hole 7 is pierced in the embossed portion 6 of the plate 5 to provide means for securing the said plate 5 to the trip pan 3. Jaw recesses 8 are cut in the center of the said plate 5 opposite to each other. In cutting the said jaw recesses 8, ears 9 are provided and formed into hinge loops 10. Hinge plates 11 formed with loops 12 are secured to the plate 5 by means of hinge bolts 13 which are passed thru the loops 10 and 12. A trigger recess 14 is cut in the center of the plate 5 at right angles to the jaw recesses 8.

The plate 5 is secured to the trap 1 in its sprung position by folding back the hinged plates 11 and placing the said plate 5 between the jaws 2 and the trip pan 3, permitting the jaw recesses 8 to engage the sides of the jaws 2 and then securing the said plate 5 to the trip pan 3. After the plate 5 has been secured to the trip pan 3 the trap may be readily set in the usual manner the side portions of the jaws passing over the ends of the plate as shown in Figure 1. The hinge plates 11 cover the pivot joints of the jaws. The trap is sprung by pressing upon the plate 5. When the trigger 4 snaps and the jaws 2 begin to close the hinge plates 11 move up and out of the way of the said jaws permitting them to snap shut. It is evident that the contour of the plate does not reside within the scope of the invention and that the same may be readily changed to adapt the plate to the various makes and shapes of traps used in trapping.

While I have herein described a certain specific method of constructing and assembling the elements of my invention, it is understood the same may be varied in minor details, not departing from the spirit of my invention as defined in the appended claims.

I claim:

1. A trap covering as described, comprising a plate pierced with jaw and trigger recesses; a central emboss formed in the said plate; hinge loops formed in said plate adjacent said jaw recesses; hinge plates formed with loops, hingedly secured to said hinge loops; and means for securing said plate to the trip pan of a trap.

2. A trap covering as described, comprising a plate, pierced opposite to each other on its central outer edge with jaw recesses and a trigger recess at right angles to the jaw recesses; an embossed portion slightly larger than the trip pan formed in the center of said plate; hinge loops formed in said plate adjacent the jaw recesses; hinge plates formed with loops, hingedly secured to said hinge loops; and means for securing said plate to the trip pan of a trap.

In testimony whereof I affix my signature.

THEODORE J. THORESON.